United States Patent [19]

Walton

[11] Patent Number: 4,541,483

[45] Date of Patent: Sep. 17, 1985

[54] METHOD FOR STIMULATION OF OIL AND GAS WELLS WITH PHOSPHATE ESTER SURFACTANTS

[75] Inventor: William B. Walton, Cleburne, Tex.

[73] Assignee: Borg-Warner Chemicals, Inc., Parkersburg, W. Va.

[21] Appl. No.: 601,413

[22] Filed: Apr. 18, 1984

[51] Int. Cl.$^4$ .............................................. E21B 43/22
[52] U.S. Cl. ................................. 166/263; 166/305.1; 166/312; 252/8.55 B
[58] Field of Search ............... 166/263, 273, 274, 275, 166/305 R, 312; 252/8.55 B, 8.55 D

[56] References Cited

U.S. PATENT DOCUMENTS

| | | | |
|---|---|---|---|
| 3,435,898 | 4/1969 | Thompson | 166/274 |
| 3,467,192 | 9/1969 | Nolan et al. | 252/8.55 B X |
| 3,467,194 | 9/1969 | Kinney et al. | 166/305 R |
| 3,470,958 | 10/1969 | Kinney et al. | 166/305 R |
| 3,480,083 | 11/1969 | Oleen | 166/275 |
| 3,596,715 | 8/1971 | Halbert | 166/274 |
| 3,620,303 | 11/1971 | Halbert | 166/272 |
| 3,770,815 | 11/1973 | Jones | 252/8.55 B X |
| 3,787,533 | 1/1974 | Larson | 252/8.55 B X |
| 4,278,129 | 7/1981 | Walton | 166/263 |

Primary Examiner—George A. Suchfield
Attorney, Agent, or Firm—Richard J. Schlott

[57] ABSTRACT

Crude oil and gas production wells, which no longer produce oil or gas utilizing conventional primary and secondary means of recovery, can be returned to production by treatment comprising addition of a non-aqueous solution of certain phosphate ester surfactants followed by successive treatment with water or a hydrocarbon. Increased production also can be obtained in low-producing oil and gas wells by similar treatment with certain phosphate ester surfactants. Subsequent to treatment of a producer well, the phosphate ester surfactant is forced into the formation utilizing water or a hydrocarbon and said surfactant is allowed to remain in the producing well, for an effective period of at least 12 hours. Thereafter, pumping and/or conventional fluid drive means are then utilized to recover oil or gas from the subterranean oil or gas formation. The amount of non-aqueous surfactant solution utilized is sufficient to permeate the oil or gas subterranean formation in the area immediately adjacent to the producing well bore and up to a radius therefrom of about 20 feet.

10 Claims, No Drawings

METHOD FOR STIMULATION OF OIL AND GAS WELLS WITH PHOSPHATE ESTER SURFACTANTS

BACKGROUND OF THE INVENTION

1. Field of the Invention

This invention relates to oil and gas production well stimulation where said wells are low-producing or have ceased to produce by primary and secondary recovery means.

2. Description of the Prior Art

Certain phosphate esters have been used in conjunction with water-flood methods of driving oil toward producing wells as a means of secondary recovery of hydrocarbons. The phosphate esters are added to an injection well and perform various functions such as scale inhibition, and the formation of a slug for driving the oil in the formation toward the producing well. The phosphate ester can be injected into the well either as an aqueous solution or as a soluble oil micro-emulsion. Alkyl and aralkyl polyoxyalkylene phosphates are disclosed as useful surfactants in water-flood secondary recovery processes. Such processes are disclosed in U.S. Pat. Nos. 3,435,898, 3,596,715, and 3,480,083.

Producing oil and gas wells have long been treated to stimulate production thereof utilizing a method termed "acidizing" in which an emulsion of an aqueous mineral acid either alone or in combination with various surfactants, corrosion inhibiting agents, and hydrocarbon oils is added to a producer well. Presumably, such treatments tend to remove deposits from the area of the subterranean oil or gas formation immediately adjacent to the production well bore, thus increasing the permeability of the formation and allowing residual oil or gas to be recovered through the well bore. Another object of such "acidizing" treatment of oil or gas producer wells is the removal of water from the interstices of the formation by the use of a composition which materially lowers the interfacial forces between the water and the oil or gas. Various surface-active agents have been recommended for this use.

Usually, the surface-active agent is injected into the production well in combination with crude oil or other hydrocarbon solvent followed by the injection of additional crude oil to move the treating fluid into the formation. U.S. Pat. Nos. 3,467,194 and 3,470,958 provide specifically for the treatment of a crude oil production well utilizing an oil-external micellar dispersion or a water-external micellar dispersion followed by the injection of a hydrocarbon to move the micellar dispersion outwardly from the well bore into the formation. There is disclosed in U.S. Pat. No. 3,620,303 a method of treating a production well with an aqueous solution of an anionic orthophosphate ester surfactant. The aqueous surfactant solution is retained in the formation at least about 24 hours and thereafter the solubilized hydrocarbon is displaced toward the producer well by fluid drive means utilizing a second well bore which is in fluid contact with the underground oil formation. It is theorized that the surfactant solution forms a soluble oil micro-emulsion with the formation hydrocarbons.

In U.S. Pat. No. 4,278,129, there is disclosed a method of increasing production or returning to production oil and gas wells by the treatment of a production well comprising adding an aqueous solution of an oxyalkylated phosphate ester surfactant and thereafter adding a hydrocarbon to drive the aqueous surfactant solution into the formation a distance of about 3 to about 20 feet from the well bore. The aqueous surfactant solution is allowed to remain in the formation for an effective period generally not less than 24 hours and preferably 24 hours to 1 month. Thereafter, the oil or gas is recovered using pump and/or conventional fluid drive means wherein water is injected into an injection well in communication with said oil or gas subterranean formation.

There is no indication in any of the prior art references that solutions and dispersions of oxyalkylated phosphate ester surfactants in non-aqueous solvents would be useful in returning to production oil and gas wells which are low-producing or have ceased to produce. The method of the invention is particularly useful in the stimulation of oil and gas wells which have failed to respond to acidizing treatment of the producing well including the use of various acids with various surfactants, and may also be used effectively in the treatment of water-sensitive formations.

SUMMARY OF THE INVENTION

This invention is directed to a method for increasing production or returning to production oil and gas wells by treating a production well with a non-aqueous solution of an oxyalkylated phosphate ester surfactant and thereafter adding a hydrocarbon or water to displace the surfactant solution into the formation a distance of about 3 to 20 feet from the well bore. The surfactant solution is allowed to remain in the formation for an effective period, generally for several hours, preferably for 12 hours to a week, after which the oil or gas is recovered using a pump or alternatively using a conventional fluid drive means whereby water is injected into an injection well to displace the oil or gas.

In prior art processes, such as those described in U.S. Pat. No. 4,278,129, the oxyalkylated phosphate ester is placed in the formation as an aqueous solution. The availability of a suitable water supply at well sites can be a problem, thus limiting the utility of these prior art processes or rendering their application in some instances more difficult and less economical. In the process of the present invention, the use of a non-aqueous solvent or solvent mixture to place the oxyalkylated phosphate ester surfactant into the formation avoids the need for water supply of suitable quality. In addition, the instant process, being non-aqueous, permits rapid dispersion of the water-soluble surfactant into any formation water present in well bore, and by virtue of having good miscibility with the hydrocarbons present in the well, aids in dispersing the surfactant into the hydrocarbon well fluids to more rapidly reduce interfacial forces and attain good mobility. The non-aqueous solvent may thus be regarded as a mutual solvent for the alkoxylated phosphate ester surfactant and the formation fluids.

The non-aqueous solutions of surfactants of this invention will be particularly useful in the treatment of well formations having a high clay content. Clay formations are generally sensitive to aqueous fluids, becoming swelled to the point of complete impermeability. Aqueous systems are thus avoided where clay formations are present. The non-aqueous surfactant solutions of this invention are also frequently more effective in the treatment of well formations containing a high level of paraffins and asphaltenes. This may be due in part to the ability of the non-aqueous solvents to solubilize and remove hydrocarbons from the formation surfaces, thus increasing penetration into the interstices of the formation.

DESCRIPTION OF THE PREFERRED EMBODIMENTS

The oxyalkylated phosphate ester which is an active ingredient in the process disclosed herein for increasing production or returning nonproducing oil and gas wells to productivity is an alkyl or aralkyl polyoxyalkylene phosphate ester surfactant. The surfactant can be used in the free-acid form or as the alkali metal, amine or ammonium salt. The phosphate esters of the invention have the formulas:

$$(OH)_2R_1-O-[(A)_n-O]_x-\overset{O}{\underset{\parallel}{P}}-(OX)_y$$

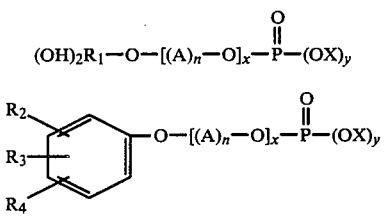

wherein $R_1$ represents an alkyl radical having 10 to 18 carbon atoms, for instance, nonyl, decyl, undecyl, dodecyl, tridecyl, tetradecyl, pentadecyl, hexadecyl, heptadecyl, octadecyl, nonadecyl, eicosyl, uneicosyl, docosyl, tricosyl, tetracosyl, pentacosyl, hexacosyl, and heptacosyl radicals. $R_2$ represents an alkyl of about 5 to 27 carbon atoms, e.g., pentyl, heptyl, hexyl, etc., higher alkyls of the same value as $R_1$, cycloalkyl, e.g., cyclopentyl, cyclohexyl, cycloheptyl, cyclooctyl, methylcyclopentyl, methylcyclohexyl, methylcyclooctyl, methylcyclobutyl, 1,1-dimethylcyclopropyl, ethylcyclopropyl, ethylcyclobutyl, 1-ethyl-2-methylcyclopropyl, 1,1,2-trimethylcyclopropyl, 1,2,3-trimethylcyclopropyl, 1,1-dimethylcyclopentyl, 1,2-dimethylcyclopentyl, 1,3-dimethylcyclopentyl, 1,2-dimethylcyclohexyl, 1,3-dimethylcyclohexyl, 1,4-dimethylcyclohexyl, ethylcyclohexyl, ethylmethylcyclopentyl, 1,1,2-trimethylcyclopentyl, cyclononyl, propylcyclohexyl, 1,2,4-trimethylcyclohexyl, 1,3,5-trimethylcyclohexyl, 1-isopropyl-4-methylcyclohexyl, 1,2,4,5-tetramethylcyclohexyl, and radicals derived from mineral oils containing alkyl, cycloalkyl and mixed alkylcycloalkyl radicals having from about 12 to 27 carbon atoms. $R_3$ and $R_4$ represent either hydrogen, alkyl of from about 1 to 22 carbon atoms, e.g., methyl ethyl, propyl, butyl, and the higher alkyls defined by $R_1$ and cycloalkyls defined by $R_2$ or radicals derived from mineral oils. A represents the residue of ethylene oxide, ethylene oxide and tetrahydrofuran, or mixed lower alkylene oxides selected from the group consisting of ethylene oxide, propylene oxide, and butylene oxide alone or including tetrahydrofuran, wherein the total molecular weight of said ester is about 500 to about 1500, preferably about 600 to about 1200, and wherein A can be heteric or block in molecular configuration. The degree of oxyalkylation is represented by n, x and y are 1 or 2, the sum of x and y is 3, and z is an integer of 0 to 5; X is hydrogen or a monovalent cation selected from the group consisting of at least one of an alkali metal, alkyl amine and ammonium. In the formation of the polyhydroxyl oxyalkylene polymer, at least one alkylene oxide or tetrahydrofuran is utilized. Preferably at least 2 alkylene oxides or tetrahydrofuran and one alkylene oxide are utilized. In the formation of said phosphate ester surfactants, alkyl or aralkyl alcohols can be reacted with alkylene oxides in accordance with well known prior art procedures.

The phosphorus acid reactants with which the polyhydroxy oxyalkylene compounds are reacted in the formation of the phosphate esters of the invention can be selected from the group consisting of at least one of phosphorus pentoxide, and polyphosphoric acid. Where the polyhydroxy oxyalkylated compounds are derived from mixtures of lower alkylene oxides or tetrahydrofuran, it is preferred that the compounds be mixtures of ethylene oxide and propylene oxide and that where block or heteric copolymers of these alkylene oxides are formed, it is preferred that the proportion of ethylene oxide be about 10 to about 90 percent by weight and the proportion of propylene oxide be about 90 percent to about 10 percent by weight. These surfactants can be utilized in the form of mono-, di- and mixed mono- and diphosphate esters. Where the surfactants are utilized in the free acid form, the monoesters are characterized by the formulas above in which X is hydrogen. The surfactants are generally available in anhydrous form or may be prepared to be substantially anhydrous. However, minor amounts of water, generally less than about 10 wt% based on surfactant, may be present and is permissable in the practice of the invention.

The solvents useful in the practice of this invention for forming the non-aqueous surfactant solution include alcohols, such as, for example, aliphatic alcohols, glycols, polyglycols and glycol ethers, as well as mixtures thereof, and may further include aromatic hydrocarbon solvents such as benzene, toluene, xylene and the like. Minor amounts of water may be present, in as much as the solvents employed are industrial grade materials, and the presence of water in minor quantities will be understood by those skilled in the art as being within the scope of this invention. In general the solvent or solvent mixture selected will be capable of dissolving from 5 to 50 wt% of the particular oxyalkylated phosphate ester employed.

The phosphate ester disclosed has been found superior to the surfactants disclosed in the prior art as useful in oil well stimulation and thus the disclosed phosphate ester surfactants can be utilized as the sole surfactant in preparing the non-aqueous solution useful in treating the oil or gas production well. Generally, the concentration of said surfactant in the non-aqueous solvent medium is about 5 to about 50 percent by weight, preferably about 10 to 20 percent by weight, and most preferably about 12 to about 18 percent by weight. The amount of non-aqueous surfactant solution utilized in the treatment of an oil or gas well will, of course, vary with the vertical feet of oil-bearing formation around the producing well bore. Generally, there is injected into the oil- or gas-bearing subterranean formation, about 0.5 to about 10 barrels of the non-aqueous surfactant solution per vertical foot of oil- or gas-bearing formation. There is thereafter added to the well sufficient fluid, which may be water such as production water or hydrocarbon such as crude oil into the well bore to displace said non-aqueous surfactant solution out in the formation. Generally, the non-aqueous surfactant solution is retained in the formation for several hours, preferably not less than 12 hours and more preferably 12 hours to 1 week. Thereafter, the non-aqueous solution of said phosphate ester and said fluid (water or hydrocarbon) are removed by pumping or displaced from the formation by conventional fluid drive means by use of an injection well in fluid communication with the treated production well. The desired oil or gas is thereby produced.

In addition to fluids such as water and crude oil having generally the viscosity of the oil-bearing formation of the oil well to be treated, various hydrocarbon solvents are also useful to displace the non-aqueous solution of surfactant out in to the reservoir. Such hydrocarbon solvents as the low molecular weight, generally liquid hydrocarbons boiling below the gasoline range, such as the lower alkanes including butane, propane, pentane, hexane and heptane, as well as natural gasoline, petroleum naphtha and kerosene or mixtures of these hydrocarbons, are useful. Both sweet and sour crude oil is useful as a hydrocarbon to displace the non-aqueous surfactant solution out into the subterranean reservoir of oil or gas.

The following examples illustrate the various aspects of the invention but are not intended to limit its scope. When not otherwise specified throughout this specification and claims, temperatures are given in degrees centigrade and parts, percentages, and proportions are by weight.

EXAMPLE 1

A well treatment was simulated. A pressure vessel in the form of a 4000 ml graduated cylinder fitted at the exit with a ceramic filter having an 80 micron porosity (similar to well formation porosity) was filled with production water from a Texas oil well. The cylinder was capped and pressurized with nitrogen at 20 psi. Flow of the water through the filter stopped due to plugging by the well solids present in the water after 250 ml had passed through the filter. The filter with caked solids was then removed and placed in a non-aqueous solvent mixture containing 15 wt% of a mixed mono- and diphosphate ester of a block copolymer of 73 wt% ethylene oxide and 27 wt% propylene oxide, initiated with a 10 to 12 carbon aliphatic alcohol and having a molecular weight of about 1000 (90% solids in water), 17 wt% methanol, 17.74 wt% capryl alcohol, 43.26 wt% isopropanol and 17 wt% xylene. The filter cake was dissolved or dispersed in 15 min.

As a control, a second filter cake was placed in the above solvent mixture but containing no surfactant (20 wt% methanol, 50.9 wt% isopropanol, 9.1 wt% capryl alcohol and 20 wt% xylene). The filter cake was dispersed only slowly, requiring 90 minutes to dissolve.

It will be apparent that the combination of non-aqueous solvent and surfactant according to the practice of this invention is considerably more effective than non-aqueous solvents alone in removing caked well solids from a porous surface.

EXAMPLE 2

An injection well in Texas was taking water by injection at a rate of 125 bbl per day at a pressure of 800 psi. The well was treated with a 15 wt% solution of a mixed mono- and diphosphate ester of a block copolymer of 85 wt% ethylene oxide and 15 wt% propylene oxide initiated with an aliphatic alcohol having 10 to 12 carbon atoms and a molecular weight of about 900 dissolved in a mixed non-aqueous solvent including methanol, isopropanol, capryl alcohol and xylene in a ratio of approximately 2:5:1:2 by pumping the non-aqueous solution into the well, then displacing it with approximately 30 bbl of water. After shutting in for about 14 hrs, the water injection was restarted. Water flow into the treated injection well then proceeded at a rate of 680 bbl per day at a pressure of 165 psi.

The treatment of the well with a non-aqueous surfactant solution according to the practice of this invention is thus clearly effective in improving the porosity of well formations.

It will be recognized by those skilled in the art that the examples above are provided by way of illustration and that many variations are possible without departing from the spirit and scope of the invention.

I claim:

1. A method of treating oil- and gas-bearing subterranean formations to improve permeability thereof and increase or restore production of oil or gas comprising introducing into said formation through a producing means in fluid communication with said oil- or gas-bearing subterranean formation, a treating fluid comprising:

(A) a non-aqueous solution comprising alcohol, aromatic hydrocarbon and from about 5 to about 50 weight percent of an alkyl or aralkyl polyoxyalkylene phosphate ester surfactant having the formulas:

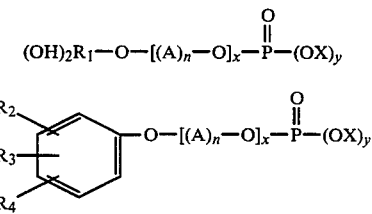

wherein $R_1$ represents an alkyl radical having 10 to 18 carbon atoms, $R_2$ represents an alkyl radical of about 5 to about 27 carbon atoms or cycloalkyl radical and radicals derived from mineral oils containing alkyl, cycloalkyl and mixed alkylcycloalkyl radicals having from about 12 to 27 carbon atoms, $R_3$ and $R_4$ represent either hydrogen or alkyl of from about 1 to 22 carbon atoms and the higher alkyls defined by $R_1$ and cycloalkyls defined by $R_2$ or radicals derived from mineral oils; A represents the residue of ethylene oxide, ethylene oxide and tetrahydrofuran, or mixed lower alkylene oxides selected from the group consisting of ethylene oxide, propylene oxide, and butylene oxide, alone or including tetrahydrofuran, wherein the total molecular weight of said ester is about 500 to about 1500, and wherein A can be heteric or block in molecular configuration; n represents the degree of oxyalkylation; x and y are 1 or 2, the sum of x and y is 3 and z is an integer of 0 to 5; X is hydrogen or a monovalent cation selected from at least one of the group consisting of an alkali metal, alkyl amine and ammonium; and thereafter, (B) injecting a fluid selected from water and a hydrocarbon into the pore space adjacent to the well bore in amounts sufficient to displace the non-aqueous solution of said phosphate ester out into the formation, (C) retaining said non-aqueous solution of said phosphate ester and said hydrocarbon within said formation for a period of not less than 12 hours and (D) thereafter, pumping and/or displacing said non-aqueous solution of said phosphate ester and said fluid from said formation into the well bore by injecting water into said formation by an injection means in fluid communication with said oil-bearing or gas-bearing subterranean formation to produce the desired oil or gas through said producing means.

2. The process of claim 1 wherein said non-aqueous solution of said phosphate ester surfactant is injected into said formation at the rate of about 0.5 to about 10 barrels of said aqueous solution per vertical foot of oil- or gas-bearing formation and retained in the subterranean oil or gas formation for a period of 24 hours to 1 month.

3. The process of claim 2 wherein said fluid is a produced oil or a hydrocarbon boiling below the gasoline range.

4. The process of claim 3 wherein said producing well is an oil producing well, said phosphate ester is (1), prepared by reacting a polyhydroxy oxyalkylated compound with a phosphorus acid reactant selected from the group consisting of phosphorus pentoxide, polyphosphoric acid, and mixtures thereof.

5. The process of claim 4 wherein said polyhydroxy oxyalkylated compound is a block or heteric copolymer wherein A represents the residue of ethylene oxide, ethylene oxide and tetrahydrofuran, or mixed lower alkylene oxides selected from the group consisting of ethylene oxide, propylene oxide and butylene oxide alone or including tetrahydrofuran.

6. The process of claim 5 wherein said polyhydroxy oxyalkylene compound is the reaction product of at least one monohydric alcohol having 10 to 15 carbon atoms.

7. The process of claim 6 wherein said polyhydroxy oxyalkylated compound is a block copolymer of ethylene oxide and propylene oxide having a molecular weight of about 600 to about 1200.

8. The process of claim 7 wherein said block copolymer is prepared by successively reacting ethylene oxide and propylene oxide in the proportion of 10 to 90 percent by weight to 90 to 10 percent by weight respectively.

9. The process of claim 8 wherein said block polymer is prepared by successively reacting 15 percent by weight propylene oxide followed by 85 percent by weight ethylene oxide with a monohydric aliphatic alcohol having 10 to 12 carbon atoms.

10. The process of claim 9 wherein said block polymer has a molecular weight of 900.

* * * * *